(12) United States Patent  (10) Patent No.: US 7,832,740 B2
Kim et al.  (45) Date of Patent: Nov. 16, 2010

(54) LEVELING APPARATUS FOR EXCAVATOR AND FORESTRY MACHINE EQUIPMENT

(75) Inventors: In Woo Kim, Changwon-si (KR); Young Ok Park, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 104 days.

(21) Appl. No.: 12/262,564

(22) Filed: Oct. 31, 2008

(65) Prior Publication Data

US 2009/0115148 A1  May 7, 2009

(30) Foreign Application Priority Data

Nov. 7, 2007  (KR) ...................... 10-2007-0112983

(51) Int. Cl.
 *B62D 33/067* (2006.01)
(52) U.S. Cl. .................................. 280/6.154; 180/89.15
(58) Field of Classification Search .............. 280/6.154, 280/6.15, 7; 180/89.14, 89.15, 41, 9.1, 9.46, 180/9.52; 144/4.1; 248/184.1
See application file for complete search history.

(56) References Cited

U.S. PATENT DOCUMENTS

| 3,703,298 | A | * | 11/1972 | Laverda | 280/6.154 |
| 4,326,571 | A | * | 4/1982 | Crawford | 144/34.5 |
| 4,565,486 | A | * | 1/1986 | Crawford et al. | 414/729 |
| 4,650,017 | A | * | 3/1987 | Pelletier et al. | 180/9.1 |
| 4,679,803 | A | * | 7/1987 | Biller et al. | 180/9.23 |
| 4,763,742 | A | * | 8/1988 | Langford | 180/9.1 |
| 5,337,847 | A | * | 8/1994 | Woods et al. | 180/9.52 |
| 6,105,699 | A | * | 8/2000 | Hinds | 180/89.14 |
| 6,135,225 | A | * | 10/2000 | Barsic | 180/89.14 |
| 6,173,973 | B1 | * | 1/2001 | Robinson | 280/6.154 |
| 6,241,263 | B1 | * | 6/2001 | Hicks | 280/6.154 |
| 6,609,581 | B2 | * | 8/2003 | Vaile | 180/89.14 |
| 2009/0314566 | A1 | * | 12/2009 | Rust | 180/89.14 |

FOREIGN PATENT DOCUMENTS

WO  WO 99/01329  *  1/1999

* cited by examiner

*Primary Examiner*—Paul N Dickson
*Assistant Examiner*—Keith Frisby
(74) *Attorney, Agent, or Firm*—Ladas & Parry LLP

(57) ABSTRACT

A leveling apparatus for excavator and forestry machine equipment. The leveling apparatus is mounted between an upper swing structure and a lower frame formed on a lower driving structure including a swing bearing, left and right track chassis, and a front arm and a rear arm connected to upper parts of the track chassis. The leveling apparatus can keep a horizontal level of the upper swing structure against an inclined ground.

15 Claims, 12 Drawing Sheets

LEVELING APPARATUS FOR EXCAVATOR AND FORESTRY MACHINE EQUIPMENT

CROSS-REFERENCE TO RELATED APPLICATION

This application is based on and claims priority from Korean Patent Application No. 10-2007-0112983, filed on Nov. 7, 2007 in the Korean Intellectual Property Office, the disclosure of which is incorporated herein in its entirety by reference.

BACKGROUND OF THE INVENTION

1. Field of the Invention

The present invention relates generally to a leveling apparatus for excavator and forestry machine equipment, and more particularly to an improved leveling apparatus for excavator and forestry machine equipment, which is mounted between an upper swing structure and a lower driving structure to control a tilt level of the upper swing structure, which is varied depending on the ruggedness of ground or mountainous areas, without any interference with an upper frame or a track chassis.

2. Description of the Prior Art

Conventionally, heavy equipment, such as an excavator, a harvester for logging operations, and the like, may include a working device selectively mounted on an end part of a boom and having headers for logging operations, such as a bucket, a hydraulic saw, and an electric saw, in accordance with working requirements. Since the heavy equipment performs the work as it moves on the inclined ground, the equipment may be tilted to one side or may overturn due to the inclination of the ground.

For example, in the case where the heavy equipment performs a work or moves on the inclined ground, such as a slope, a hill, and the like, against a horizontal surface H, the tilt of the equipment is changed. Here, the tilt of the equipment means a range in which the equipment, the upper swing structure, or the lower driving structure is tilted to a forward, backward, or side direction against the horizontal surface H. If the tilt of the equipment is severely changed, the center of gravity of the equipment may move to an outside of a track of the lower driving structure to cause overturning of the equipment.

In particular, the heavy equipment, such as an excavator, a tree harvester for logging operations, and the like, keenly requires a leveling apparatus for moving the lower driving structure to the forward, backward, or side direction, or for smoothly performing a tilt operation at a specified angle when the tilt of the equipment is changed due to the inclination of the ground E.

According to a conventional leveling apparatus for excavator and forestry machine equipment, a geared mechanism for simply moving the center of gravity of the upper swing structure in every direction using a pinion-rack gear and a guide rail has been known. However, this technique has a drawback in that it cannot change the tilt angle of the upper swing structure.

In order to solve the above-described problem, a tilt mechanism for controlling the tilt of the equipment through tilting of the upper swing structure in every direction as supporting the load of the upper swing structure using a driving force of the actuators and a tilt shaft has been known in the art.

For example, U.S. Pat. No. 6,609,581 assigned to Tigercat Industries Inc. discloses a tilt mechanism using two actuators. According to the technology disclosed therein, two actuators are fixed to an inside of track chassis, and an upper swing structure is tilted around one tilt shaft on a lower frame provided in the lower driving structure to keep the leveling of equipment. However, this technology has the drawback in that a great load is applied to the actuators in accordance with the tilt of the equipment and the structure of the tilt mechanism and the lower frame is complicated.

As another tilt mechanism for leveling heavy equipment, U.S. Pat. No. 6,173,973 assigned to Timberjack Inc. discloses a tilt mechanism using four actuators. According to this technology, one tilt shaft is provided on a frame of a lower driving structure, and plural actuators are link-coupled to the tilt shaft and a turntable to tilt the upper swing structure in every direction.

According to this technology, however, since the actuators are arranged to be inclined inside the lower frame and the tilt is performed along with a journal shaft and a link structure, the tilt range of the upper swing structure may lean upon an inclined ground surface in the forward/backward direction or an inclined ground surface in the left/right direction of the equipment, and this makes the control of load required in the actuators difficult. Also, the capacity and the size of the actuators become unbalanced and the whole height of the heavy equipment is increased.

SUMMARY OF THE INVENTION

Accordingly, the present invention has been made to solve the above-mentioned problems occurring in the prior art while advantages achieved by the prior art are maintained intact.

One object of the present invention is to provide a leveling apparatus for excavator and forestry machine equipment, which can stably keep a horizontal level of an upper swing structure as keeping the height of the equipment low when two pairs of actuators are driven to be extended and contracted, without occurring collision or interference with a lower driving structure or a track chassis in every direction.

Another object of the present invention is to provide a leveling apparatus for excavator and forestry machine equipment, which can stably adjust a horizontal level of an upper swing structure through dispersion of load being applied to a tilt plate and actuators during controlling of a horizontal level of the upper swing structure.

In order to accomplish these objects, there is provided a leveling apparatus for excavator and forestry machine equipment, which is mounted between an upper swing structure and a lower frame formed on a lower driving structure including a swing bearing formed on a lower part of the upper swing structure, left and right track chassis, and a front arm and a rear arm connected to upper parts of the track chassis, to keep a horizontal level of the upper swing structure against an inclined ground, according to embodiments of the present invention, which includes a swing bearing mounting plate mounted on a lower part of the swing bearing and including a pair of pivot support parts projecting in a downward direction of the swing bearing to support a first tilt shaft and a pair of second piston holders; a support plate fixedly installed on an upper part of the lower frame and having a pair of pivot support parts projecting to support a second tilt shaft and a pair of first piston holders; a tilt plate mounted between the swing bearing mounting plate and the support plate to be tilted, and including a pair of first pivot holders formed to project upward from one end part of a main body, a pair of second pivot holders formed to project downward from the other end of the main body radially apart from the first pivot holders, a first shaft rotatably fixing the first pivot holders and the pivot support parts of the swing bearing mounting plate to form the first tilt shaft, and a second shaft rotatably fixing the second pivot holders and the pivot support parts of the support plate to form the second tilt shaft crossing the first tilt shaft in different directions; and a pair of first actuators one side of which is fixed to the tilt plate to rock the first tilt shaft during their extension and contraction, and a pair of second actuators fixed to rock one side of the swing bearing mounting plate during their extension and contraction; wherein the tilt plate includes a vertical center line crossing a center line in a length direction of the lower frame, and the respective actuators are installed to be radially apart from the vertical center line.

The actuators may be radially installed at intervals of 90° around the vertical center line that is parallel to the actuators.

Preferably, at least a pair of the actuators may be installed opposite to each other on a radial line drawn on a left or right side that is at an angle of about 40°~50° to the center line in the length direction of the lower frame.

The leveling apparatus according to the present invention may further include a pair of first cylinder holders provided on the tilt plate to support the first actuators so that the first actuators can be extended and contracted downward, and a pair of second cylinder holders provided on the tilt plate to support the second actuators so that the second actuators can be extended and contracted upward.

The tilt plate may be provided with a rib frame structure including a plurality of ribs in a horizontal direction corresponding to a direction of the first tilt shaft and a plurality of ribs in a vertical direction corresponding to a direction of the second tilt shaft, and the first cylinder holders and the second cylinder holders may be formed to project from the ribs.

The second tilt shaft may be below the first tilt shaft and cross the first tilt shaft at an angle of 90°.

Pistons extending and contracting in the first actuators may be fixed to first piston holders of the support plate, and pistons extending and contracting in the second actuators may be fixed to second piston holders of the swing bearing mounting plate.

The support plate may be fixedly installed on a mounting plate formed in the center of the lower frame.

The first shaft may be installed on a radial line rotated to a left or right side that is at an angle of 40°~50° to the center line in the length direction of the lower frame as in a plan view, and when the first actuators are extended and contracted upward and downward, the first pivot holders may be moved upward and downward on the basis of the second shaft that forms the second tilt shaft to change a tilt angle of the swing bearing mounting plate.

The second shaft may be installed in a direction of a slanting line tilted to a left or right side that is at an angle of 40°~50° to the center line in the length direction of the lower frame as in a plan view, and when the second actuators are extended and contracted upward and downward, the second piston holders may be moved upward and downward on the basis of the first shaft that forms the first tilt shaft to change a tilt angle of the swing bearing mounting plate.

The support plate may be provided with a rib frame structure including a plurality of ribs in a horizontal direction corresponding to a direction of the first tilt shaft and a plurality of ribs in a vertical direction corresponding to a direction of the second tilt shaft.

The first piston holders may be formed to project downward from the ribs in the vertical direction to rotatably fix the pistons of the first actuators.

The swing bearing mounting plate may be provided with a rib frame structure including a plurality of ribs in a horizontal direction corresponding to a direction of the first tilt shaft and a plurality of ribs in a vertical direction corresponding to a direction of the second tilt shaft.

The second piston holders may be formed to project downward from the ribs in the vertical direction to rotatably fix the pistons of the second actuators.

The first cylinder holders and the second cylinder holders may be provided inside a diameter that is formed when inner surfaces of the first pivot holders are extended.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a leveling apparatus for excavator and forestry machine equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
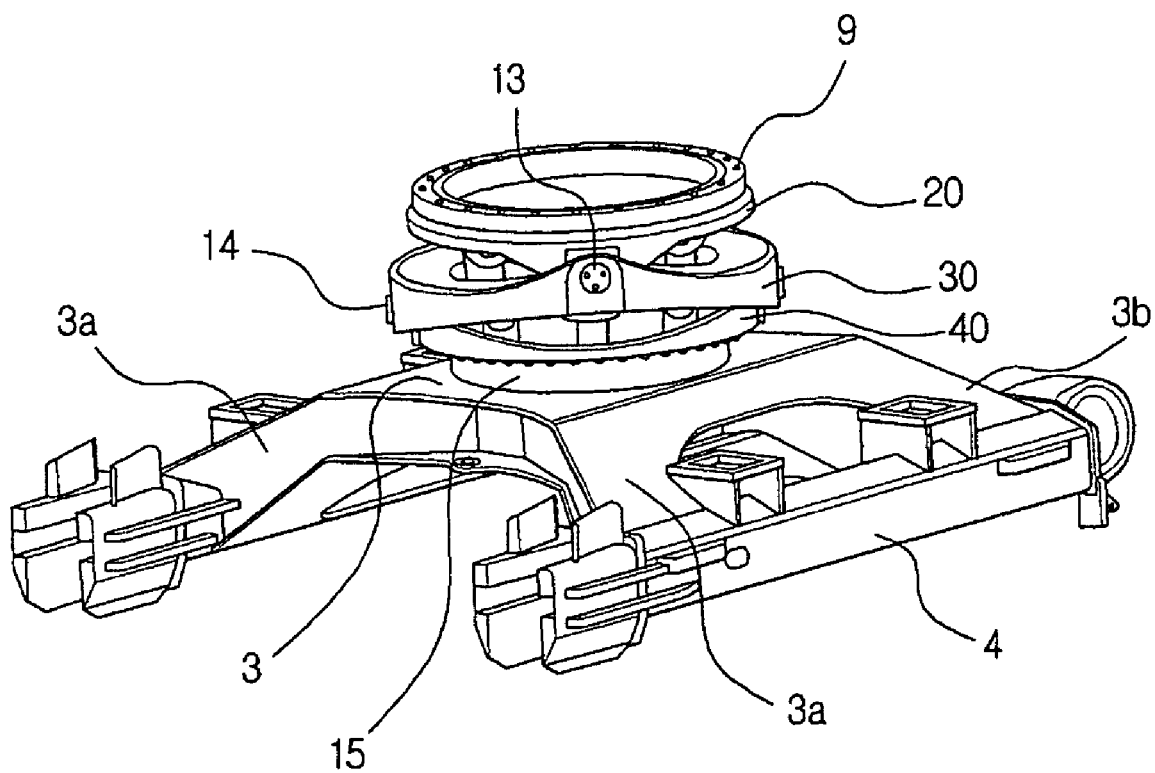
FIG. 1 is a perspective view schematically illustrating a leveling apparatus for excavator and forestry machine equipment according to an embodiment of the present invention.
Figure 2:
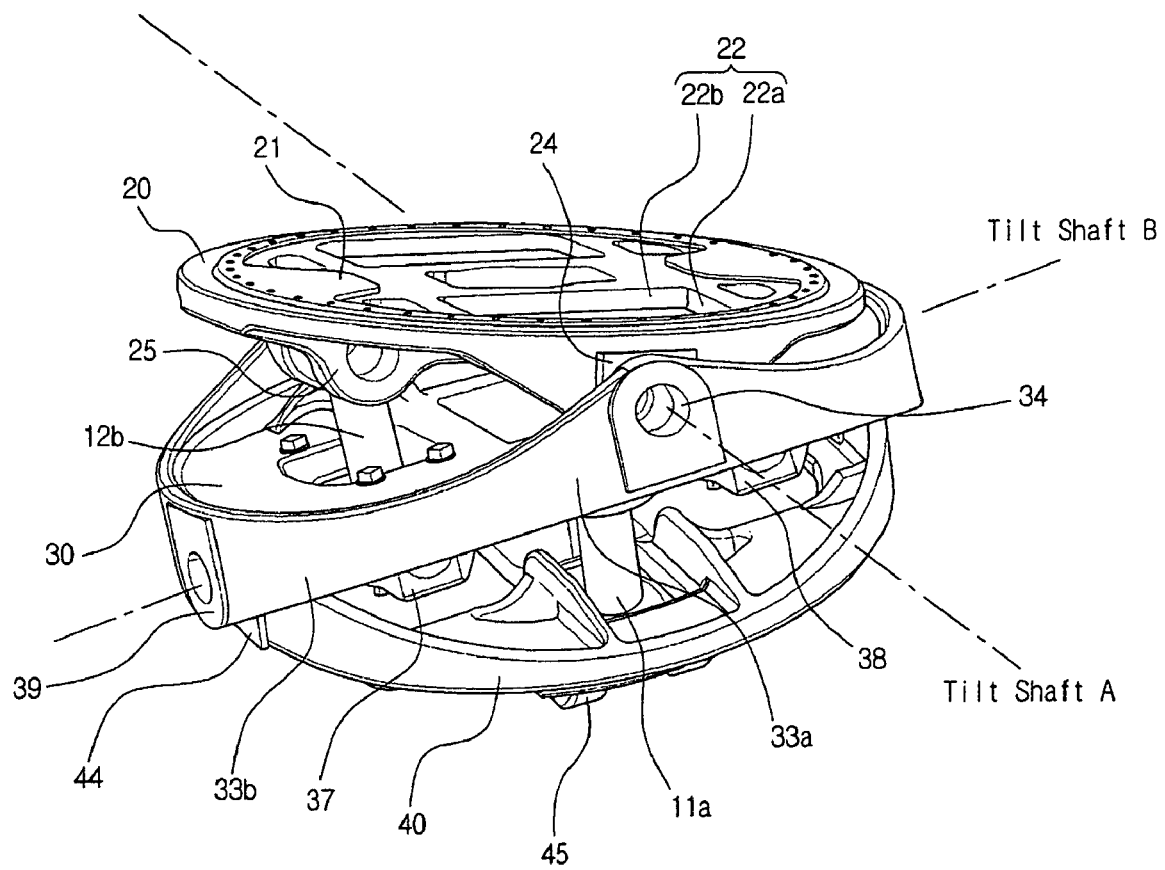
FIG. 2 is a perspective view schematically illustrating a tilt mechanism according to an embodiment of the present invention.
Figure 3:
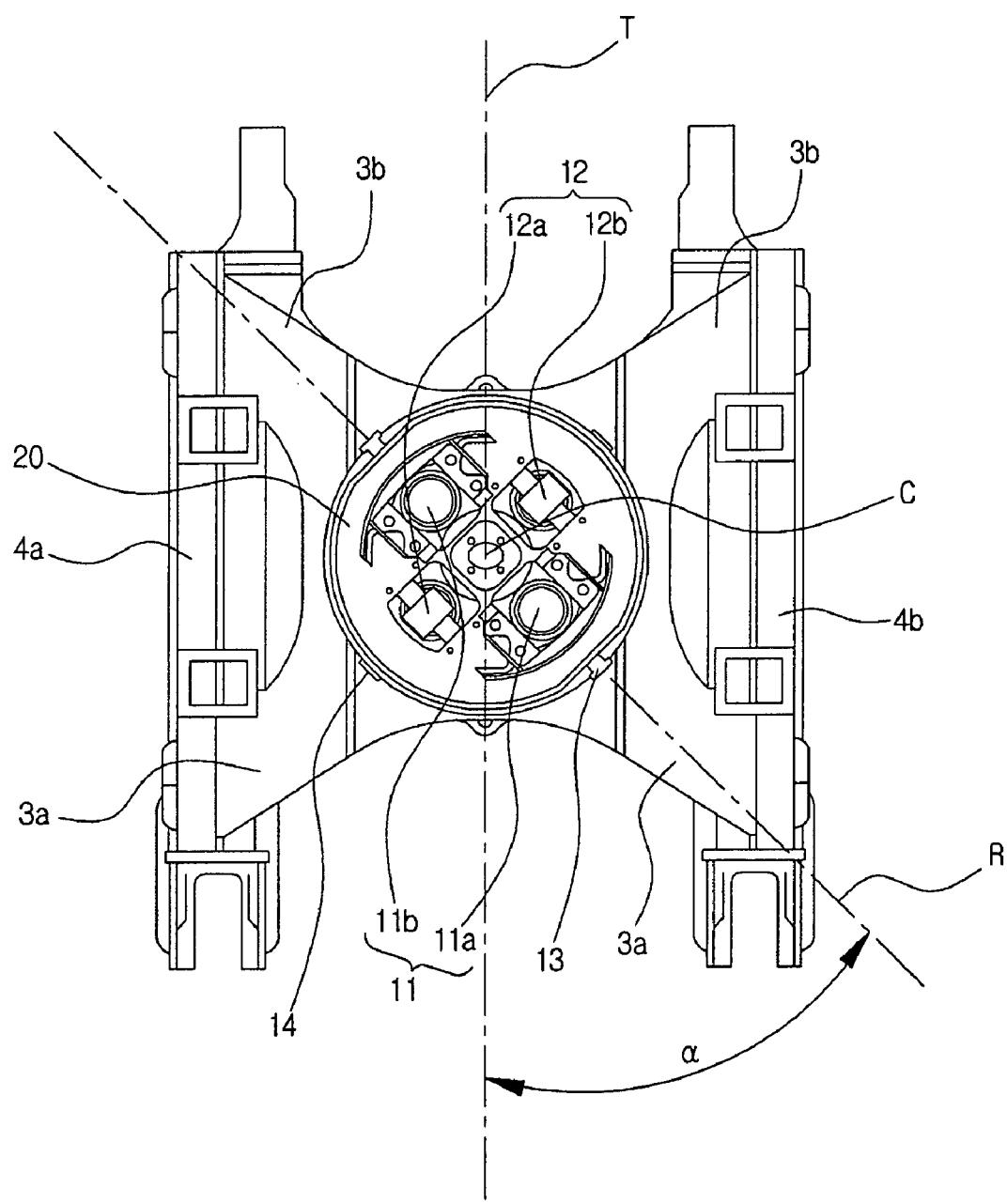
FIG. 3 is a plan view of a tilt mechanism explaining a mount structure of an actuator according to an embodiment of the present invention.
Figure 4A:
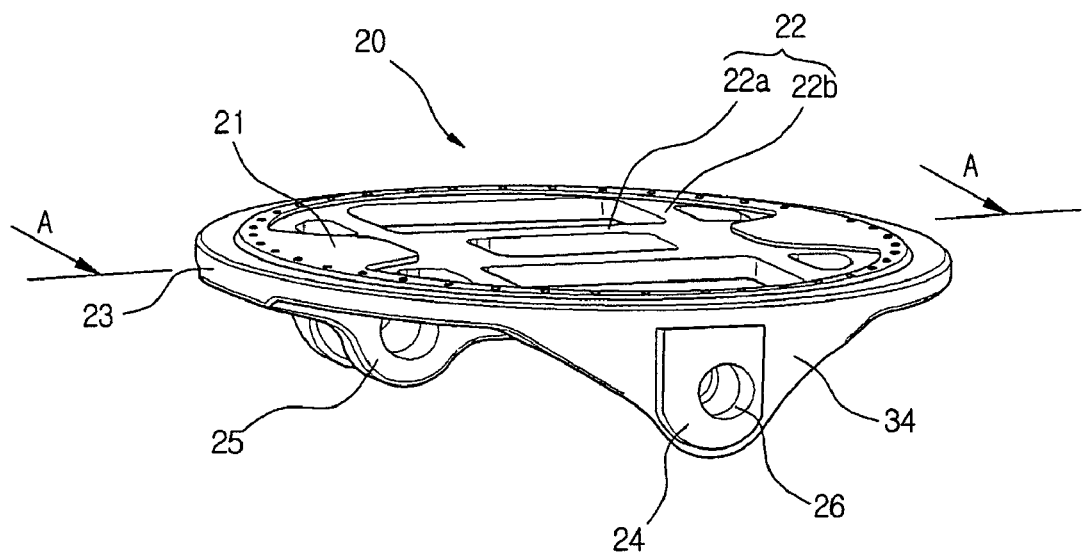
FIG. 4A is a perspective view schematically illustrating a swing bearing mounting plate according to an embodiment of the present invention.
Figure 4B:
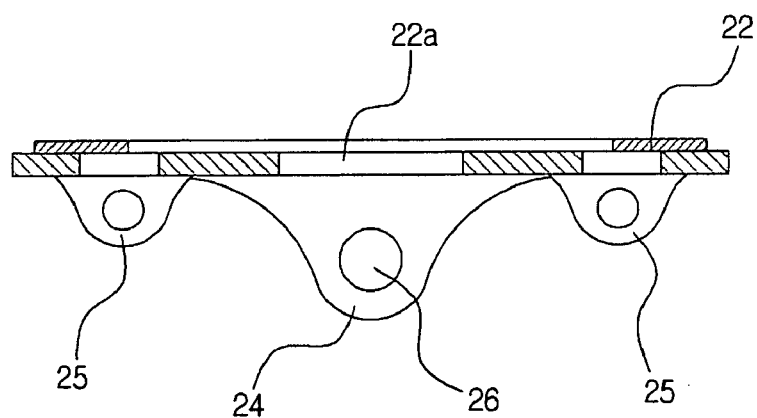
FIG. 4B is a sectional view taken along line A-A of FIG. 4A.
Figure 5:
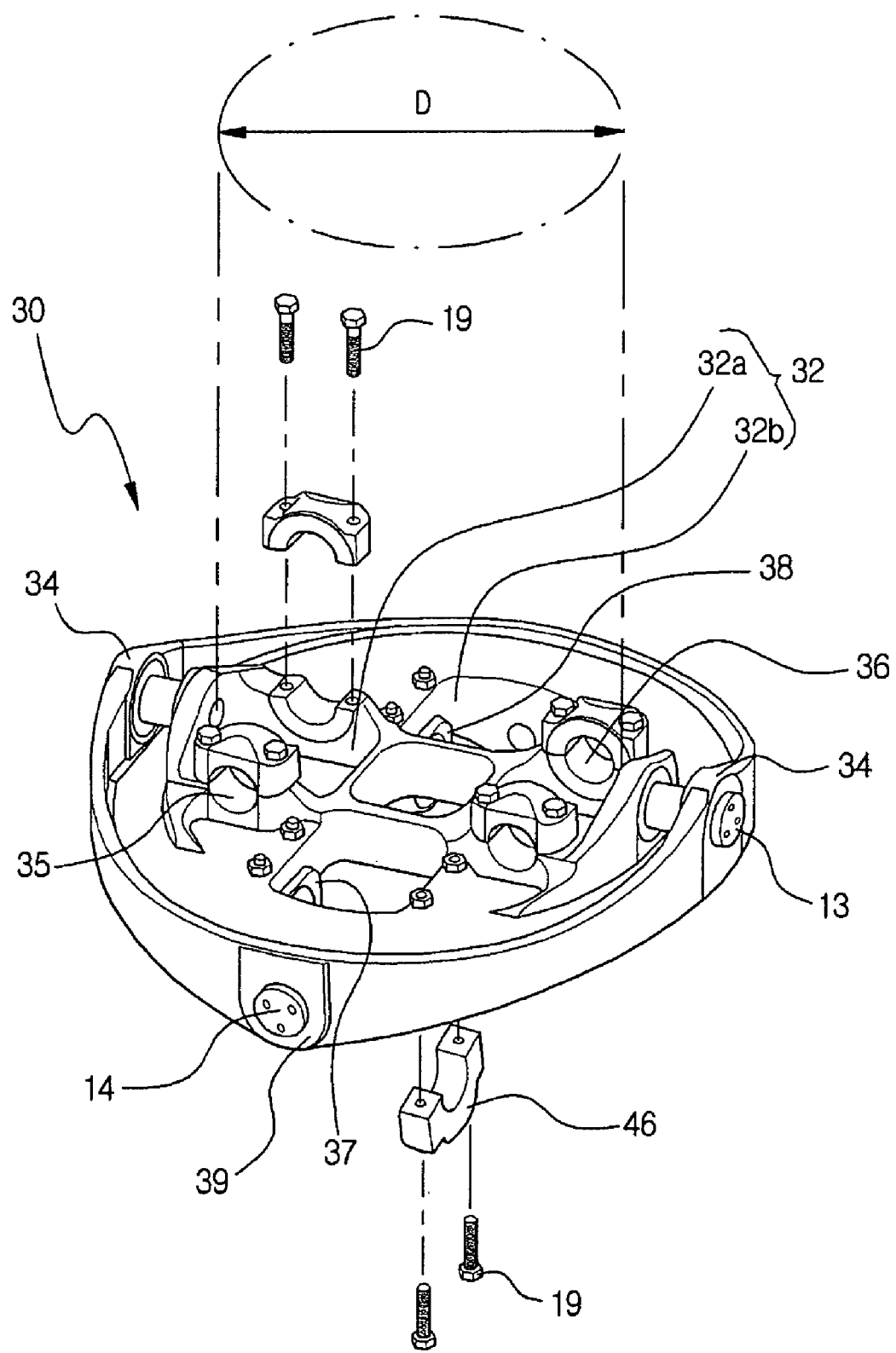
FIG. 5 is a partially exploded perspective view of a tilt plate according to an embodiment of the present invention.
Figure 6A:
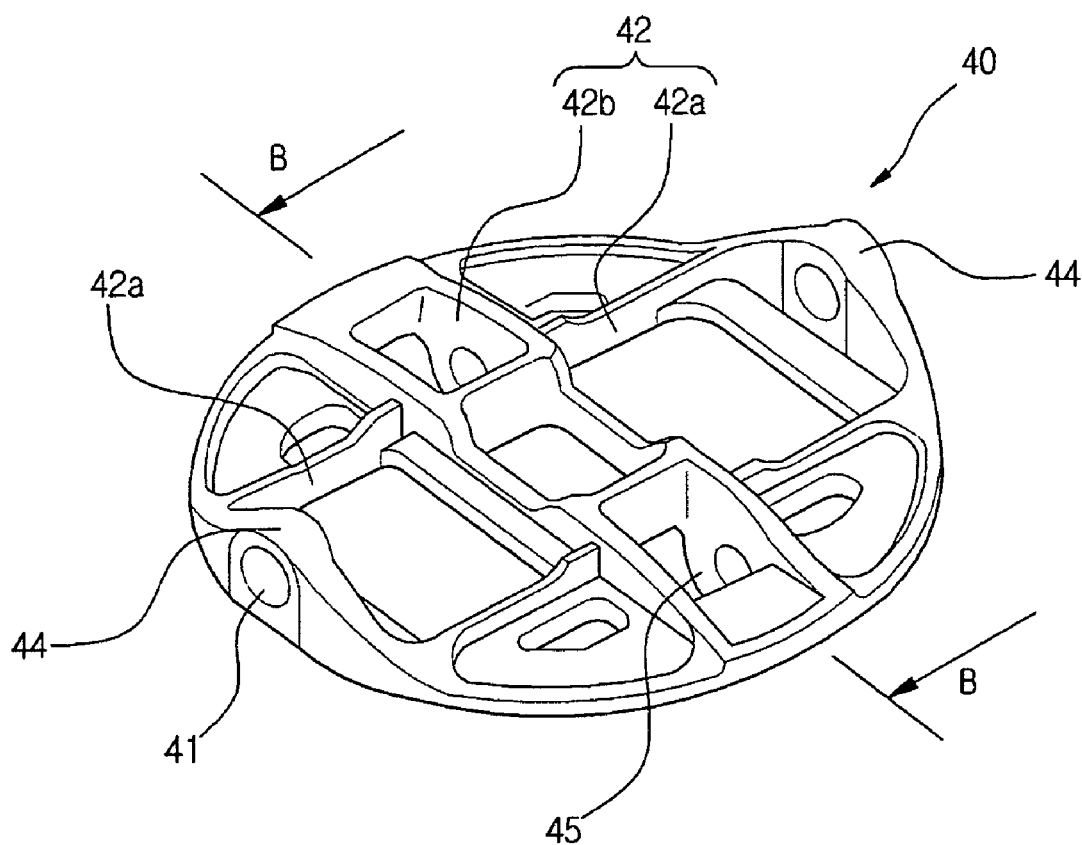
FIG. 6A is a perspective view of a support plate according to an embodiment of the present invention.
Figure 6B:
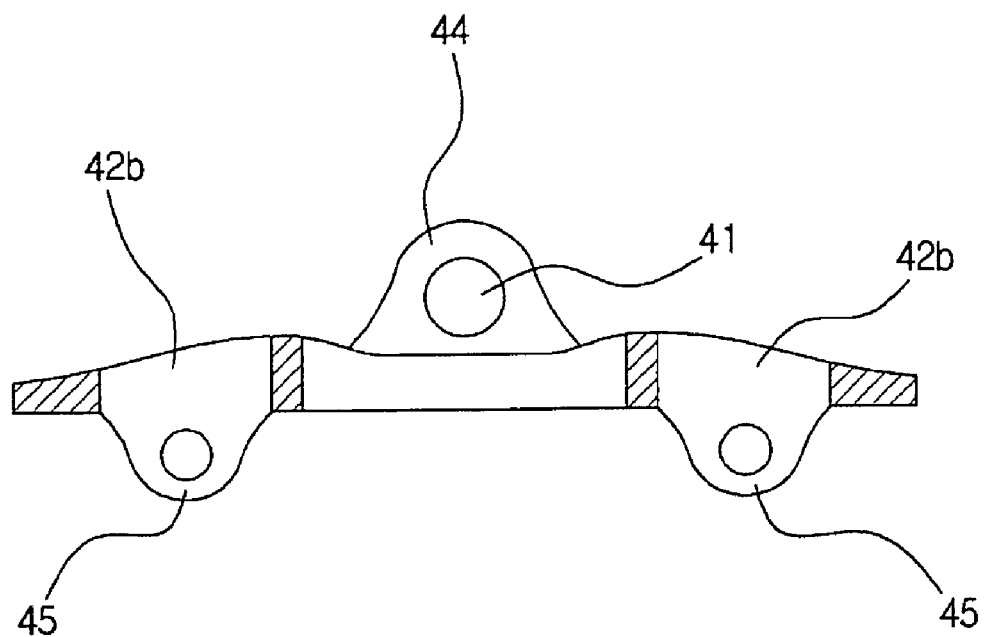
FIG. 6B is a sectional view taken along line B-B of FIG. 6A.
Figure 7A:
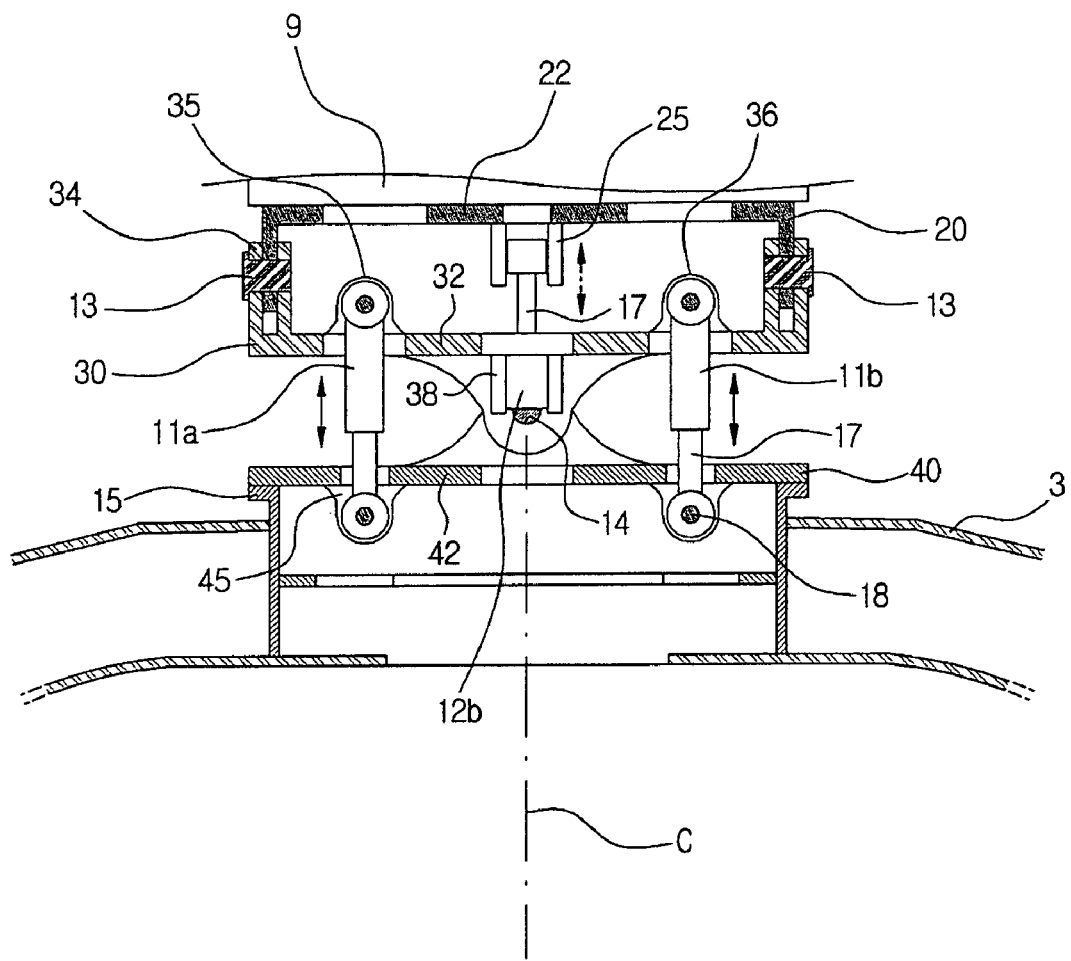
FIG. 7A is a sectional view illustrating the tilt mechanism on the basis of the tilt shaft A.
Figure 7B:
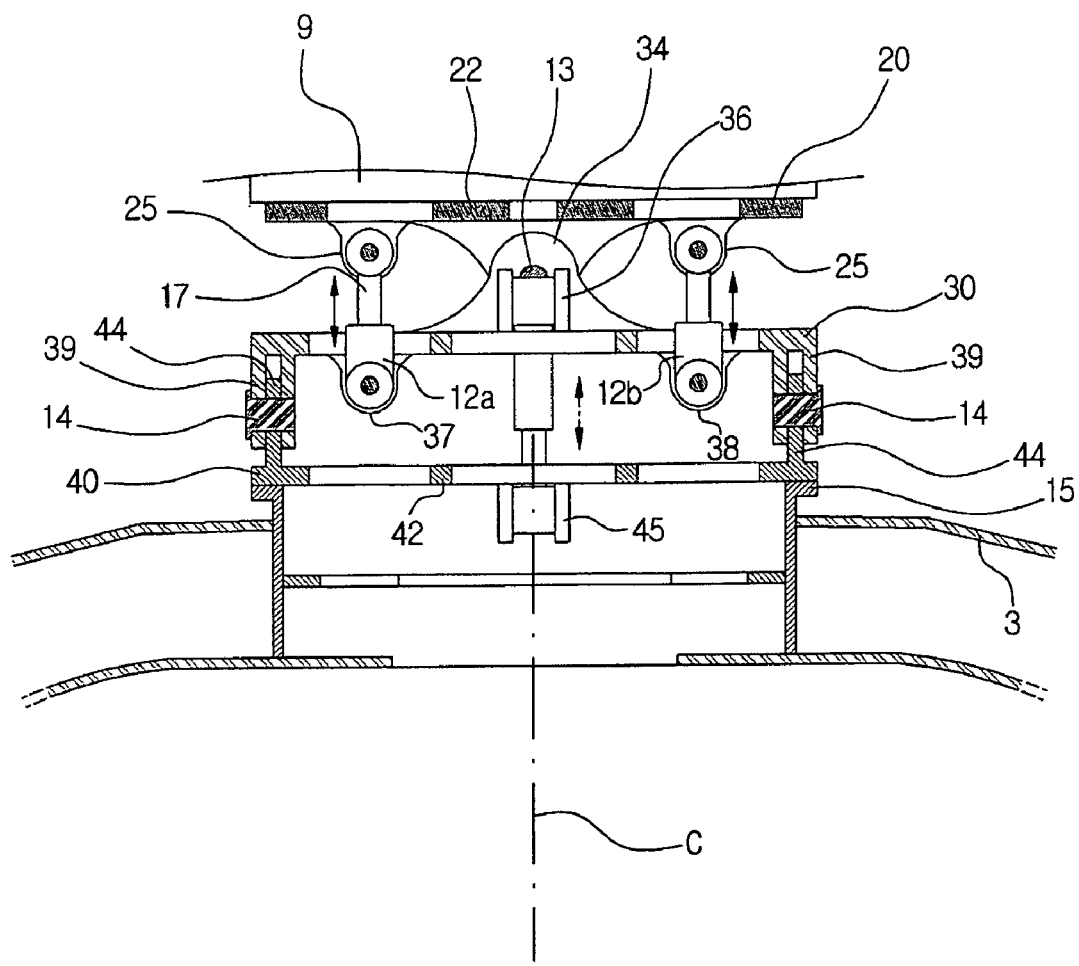
FIG. 7B is a sectional view illustrating the tilt mechanism on the basis of the tilt shaft B as illustrated in FIG. 2.
Figure 8:
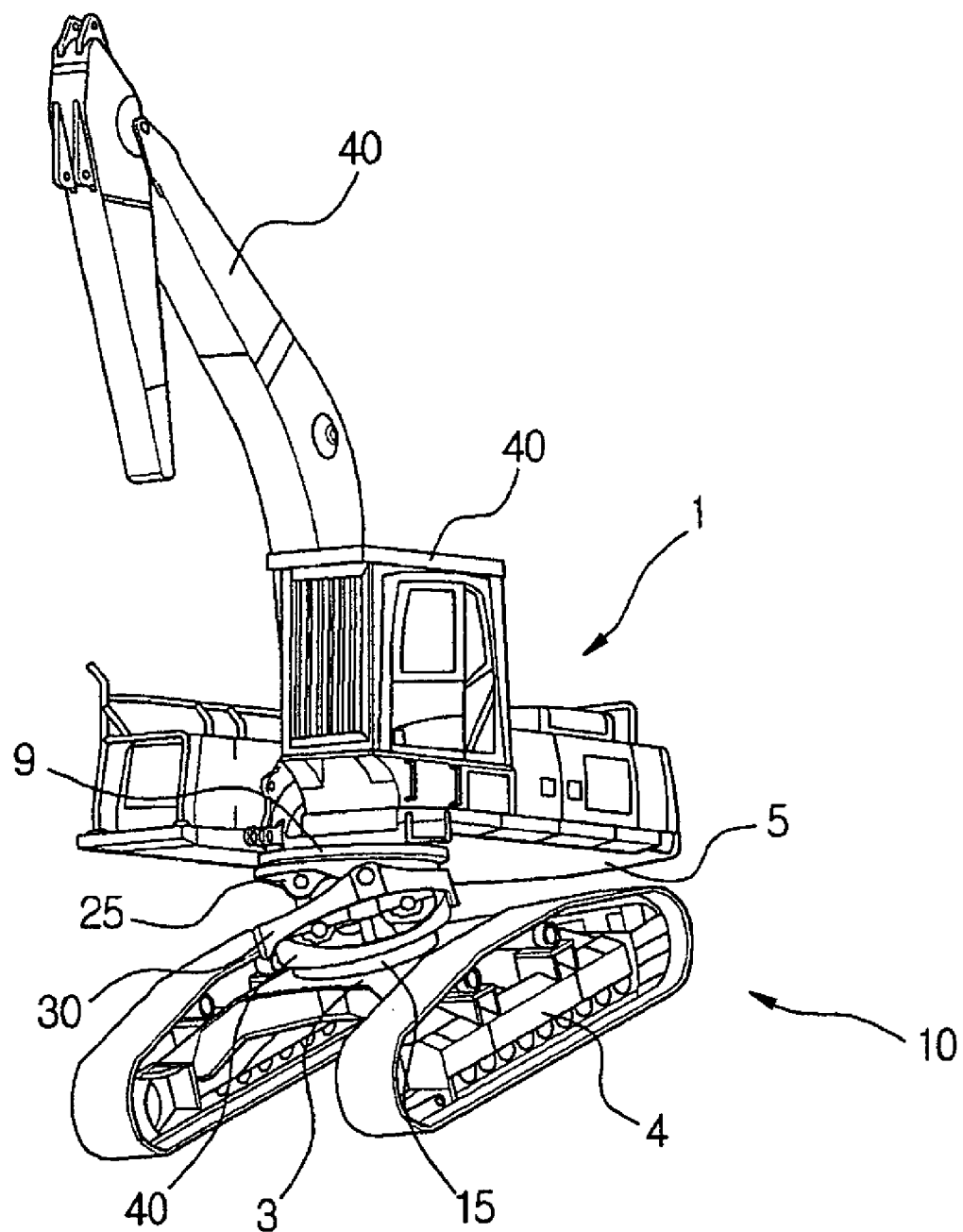
FIG. 8 is a view illustrating the use state of a leveling apparatus that is applied to excavator and forestry machine equipment.
Figure 9A:
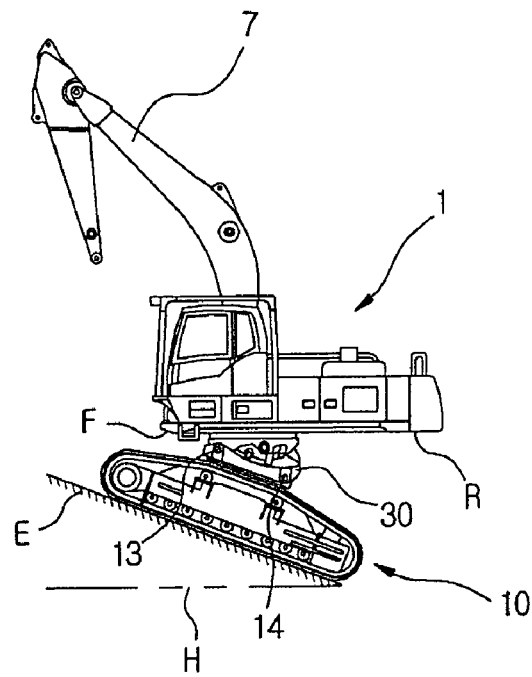
FIGS. 9A to 9D are views illustrating the use states of excavator and forestry machine equipment keeping the leveling against inclined surfaces of the ground in every direction.
Figure 9B:
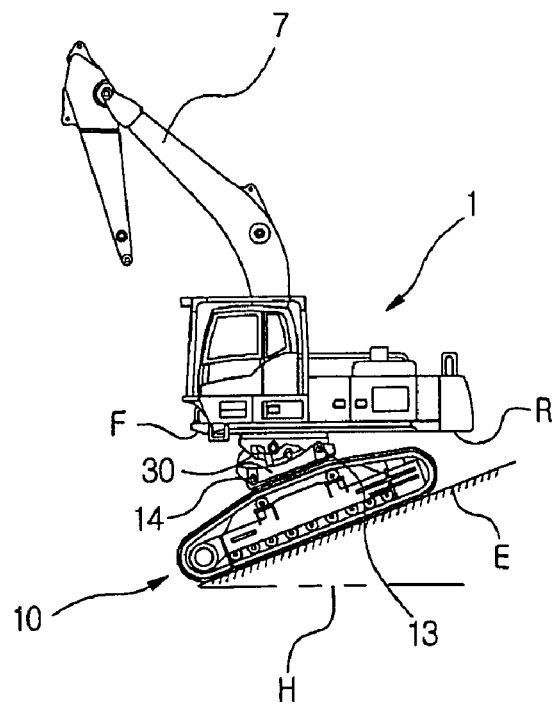
Figure 9C:
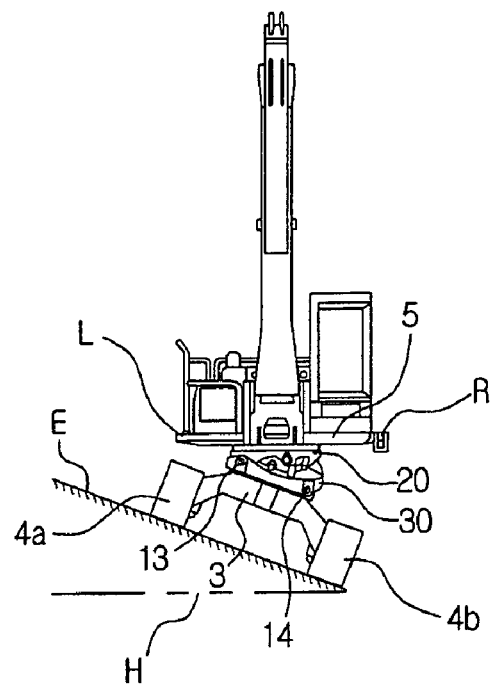
Figure 9D:
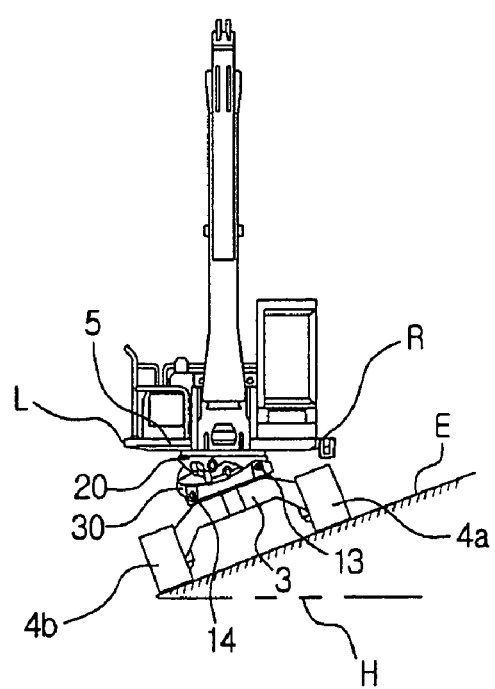

FIG. 1 is a perspective view schematically illustrating a leveling apparatus for excavator and forestry machine equipment according to an embodiment of the present invention. FIG. 2 is a perspective view schematically illustrating a tilt mechanism according to an embodiment of the present invention, and FIG. 3 is a plan view of a tilt mechanism explaining a mount structure of an actuator according to an embodiment of the present invention. FIG. 4A is a perspective view schematically illustrating a swing bearing mounting plate according to an embodiment of the present invention, and FIG. 4B is a sectional view taken along line A-A of FIG. 4A. FIG. 5 is a partially exploded perspective view of a tilt plate according to an embodiment of the present invention. FIG. 6A is a perspective view of a support plate according to an embodiment of the present invention, and FIG. 6B is a sectional view taken along line B-B of FIG. 6A. FIG. 7A is a sectional view illustrating the tilt mechanism on the basis of the tilt shaft A, and FIG. 7B is a sectional view illustrating the tilt mechanism on the basis of the tilt shaft B as illustrated in FIG. 2. FIG. 8 is a view illustrating the use state of a leveling apparatus that is applied to excavator and forestry machine equipment. FIGS. 9A to 9D are views illustrating the use states of excavator and forestry machine equipment keeping the leveling against inclined surfaces of the ground in every direction.

A leveling apparatus according to the present invention is selectively attached to or detached from a lower part of a swing bearing for excavator and forestry machine equipment so that it controls a horizontal level of an upper swing structure 1 through controlling of the inclination or tilting of the upper swing structure when the tilt of the equipment is changed due to a slope or a hill.

In the drawings, the reference numeral "10" denotes a lower driving structure, "20" denotes a swing bearing mounting plate, "30" denotes a tilt plate, and "40" denotes a support plate.

Referring to the accompanying drawings, the leveling apparatus for excavator and forestry machine equipment according to an embodiment of the present invention is mounted between an upper swing structure 1 and a lower frame 3 formed on the lower driving structure 10 including a swing bearing 9 formed on a lower part of the upper swing structure 1, left and right track chassis 4a and 4b, and a front arm 3a and a rear arm 3b connected to upper parts of the track chassis 4a and 4b, to keep a horizontal level of the upper swing structure 1 against an inclined ground E.

The leveling apparatus according to an embodiment of the present invention includes a swing bearing mounting plate 20 mounted on a lower part of the swing bearing 9 and including a pair of pivot support parts 24 projecting in a downward direction of the swing bearing 9 to support a first tilt shaft A and a pair of second piston holders 25; a support plate 40 fixedly installed on an upper part of the lower frame 3 that tilts in accordance with the inclination of the ground E, and having a pair of pivot support parts 44 projecting to support a second tilt shaft B and a pair of first piston holders 45; a tilt plate 30 mounted between the swing bearing mounting plate 20 and the support plate 40 to be tilted, and including a pair of first pivot holders 34 formed to project upward from one end part 33a of a main body, a pair of second pivot holders 39 formed to project downward from the other end 33b of the main body radially apart from the first pivot holders 34, a first shaft 13 rotatably fixing the first pivot holders 34 and the pivot support parts 24 of the swing bearing mounting plate 20 to form the first tilt shaft A, and a second shaft 14 rotatably fixing the second pivot holders 39 and the pivot support parts 44 of the support plate 40 to form the second tilt shaft B crossing the first tilt shaft A in different directions; and a pair of first actuators 11 a and 11b one side of which is fixed to the tilt plate 30 to rock the first tilt shaft A during their extension and contraction, and a pair of second actuators 12a and 12b fixed to rock one side of the swing bearing mounting plate 20 during their extension and contraction; wherein the tilt plate 30 includes a vertical center line C crossing a center line T in a length direction of the lower frame 3, and the respective actuators 11a, 11b, 12a, and 12b are installed to be radially apart from the vertical center line C.

Here, the respective actuators 11a, 11b, 12a, and 12b are fixedly installed on the tilt plate 30 at intervals of 90° around the vertical center line C that is parallel to the actuators.

As illustrated in FIG. 3, it is preferable that at least a pair of the actuators among the first actuators 11a and 11b and the second actuators 12a and 12b are installed opposite to each other on a radial line R drawn on a left or right side that is at an angle of about 40°~50° to the center line T in the length direction of the lower frame 3.

In some cases, it can be understood that if the first actuators 11a and 11b are installed opposite to each other on the radial line R rotated to a right side that is at an angle of about 45° to the vertical center line C of the tilt plate 30, i.e. if one actuator 11a of the pair is installed on the side of the front arm 3a and the other actuator 11b is installed on the side of the rear arm 3b that is at an angle of 180° to the actuator 11a to face the actuator 11a, the other pair of second actuators 12a and 12b may be installed opposite to each other on a radial line rotated to a left side that is at an angle of about 45° to the vertical center line C in the same manner.

On the other hand, according to an embodiment of the present invention, a pair of first cylinder holders 35 and 36 are provided on the tilt plate 30 to support the first actuators 11a and 11b so that the first actuators 11a and 11b can be extended and contracted downward, and a pair of second cylinder holders 37 and 38 are provided on the tilt plate 30 to support the second actuators 12a and 12b so that the second actuators 12a and 12b can be extended and contracted upward.

When the first actuators 11a and 11b are extended and contracted downward, the first pivot holder 34 and the pivot support part 24 of the swing bearing 9 are moved upward and downward to change the tilt angle of the swing bearing mounting plate 20. When the second actuators 12a and 12b are extended and contracted upward, the second piston holder 25 of the swing bearing 9 is moved upward and downward to change the tilt angle of the swing bearing mounting plate 20.

In an embodiment of the present invention, the tilt angle of the swing bearing mounting plate 20 includes an angle and a tilt of the swing bearing mounting plate 20 required to keep a horizontal level of the upper swing structure 1 through offsetting of the inclination to a horizontal surface H.

Also, the tilt plate 30 is provided with a rib frame structure including a plurality of ribs 32a in a horizontal direction corresponding to the direction of the first tilt shaft A and a plurality of ribs 32b in a vertical direction corresponding to the direction of the second tilt shaft B, and the first cylinder holders 35 and 36 and the second cylinder holders 37 and 38 are formed to project from the ribs 32.

Preferably, the ribs 32a in the horizontal direction and the ribs 32b in the vertical direction, which are formed on the tilt plate 30, cross each other at predetermined intervals, the first cylinder holders 35 and 36 fixed to the ribs 32a in the horizontal direction are formed to project upward, and the second cylinder holders 37 and 38 fixed to the ribs 32b in the vertical direction are formed to project downward.

The first cylinder holders 35 and 36 and the second cylinder holders 37 and 38 formed to project upward and downward from the ribs 32 of the tilt plate 30 serve to disperse load, which is applied thereto when the first actuators 11a and 11b and the second actuators 12a and 12b are extended and contracted, through the ribs 32a in the horizontal direction and the rib 32b in the vertical direction of the tilt plate 30.

The second tilt shaft B is below the first tilt shaft A and crosses the first tilt shaft A at an angle of 90°.

The actuators 11a, 11b, 12a, and 12b are provided with pistons 17 which are extended and contracted from a cylinder housing by hydraulic pressure.

Pistons 17 extending and contracting in the first actuators 11a and 11b are fixed to first piston holders 45 of the support plate 40, and pistons 17 extending and contracting in the second actuators 12a and 12b may be fixed to second piston holders 25 of the swing bearing mounting plate 20.

The support plate 40 is fixedly installed on a mounting plate 15 formed in the center of the lower frame 3, and it is proper to fix the support plate through a fixing member (not illustrated) including bolts and a welding means in consideration of its easy attachment and detachment.

With reference to FIG. 2, a coupling relation between the first shaft 13 and the second shaft 14 will be described. The first shaft 13 is provided in consideration of the maximum extension and contraction range of the actuators and the corresponding interferences. The first shaft 13 is installed in a direction of a slanting line rotated to the left or right side that is at an angle of 40°~50° to the center line T in the length direction of the lower frame 3 as in a plan view, and when the first actuators 11a and 11b are extended and contracted upward and downward, the first pivot holders 34 are moved upward and downward on the basis of the second shaft 14 that forms the second tilt shaft B to change the tilt angle of the swing bearing mounting plate 20.

The second shaft 14 is installed in a direction of a slanting line rotated to a left or right side that is at an angle of 40°~50° to the center line T in the length direction of the lower frame 3 as in a plan view, and when the second actuators 12a and 12b are extended and contracted upward and downward, the second piston holders 25 are moved upward and downward on the basis of the first shaft 13 that forms the first tilt shaft A to change the tilt angle of the swing bearing mounting plate 20.

In forming the first shaft 13 and the second shaft 14, it is preferable that the directions of the slanting lines coincide with each other in consideration of the upward/downward movement range of the tilt plate 30 and the swing bearing mounting plate 20 and the center of gravity of the upper swing structure 1 when the leveling is kept.

On the other hand, the support plate 40 is provided with a rib frame structure including a plurality of ribs 42a in a horizontal direction corresponding to the direction of the first tilt shaft A and a plurality of ribs 42b in a vertical direction corresponding to the direction of the second tilt shaft B, and the first piston holders 45 are formed to project downward from the ribs 42b in the vertical direction to rotatably fix front end parts of the pistons 17 of the first actuators 11a and 11b.

The first piston holders 45 formed to project downward from the ribs 42 serve to disperse load, which is applied through the pistons 17 when the first actuators 11a and 11b are extended and contracted, through the ribs 42a in the horizontal direction and the ribs 42b in the vertical direction.

The swing bearing mounting plate 20 is provided with a rib frame structure including a plurality of ribs 22a in a horizontal direction corresponding to the direction of the first tilt shaft A and a plurality of ribs 22b in a vertical direction corresponding to the direction of the second tilt shaft B, and the second piston holders 25 are formed to project downward from the ribs 22b in the vertical direction to rotatably fix the pistons 17 of the second actuators 12a and 12b.

The second piston holders 25 formed to project downward from the ribs 22 of the swing bearing mounting plate 20 serve to disperse a force or load, which is applied through the pistons 17 when the second actuators 12a and 12b are extended and contracted, through the ribs 22a in the horizontal direction and the ribs 22b in the vertical direction.

As illustrated in FIG. 5, the first cylinder holders 35 and 36 and the second cylinder holders 37 and 38 are provided inside a diameter D that is formed when inner surfaces of the first pivot holders 34 are radially extended. In diverse embodiments of the present invention, in order to install the first and second actuators 11a, 11b, 12a, and 12b, it is possible to install a separate bracket or a trunnion on the outside of the first cylinder holders 35 and 36 and the second cylinder holders 37 and 38.

In an embodiment of the present invention, as illustrated in FIG. 3, in the case where a pair of first shafts 13 that form the first tilt shaft A are installed to face each other on a radial line R rotated to the left side that is at an angle of about 40°~50° to the center line T in the length direction of the lower frame 3 as in a plan view, the first cylinder holders 35 and 36, which are provided with typical rotary pin members, are formed on an upper part of the tilt plate 30 to be apart from each other at an interval of 180° corresponding to the radial line R, the second cylinder holders 37 and 38 are formed on a lower part of the tilt plate 30 to be apart from each other at an interval of 180° corresponding to the radial line R, and the first and second actuators 11a, 11b, 12a, and 12b, which maintain the above-described arrangement structure, are mounted to be extended and contracted in the first cylinder holders 35 and 36 and the second cylinder holders 37 and 38.

Also, as illustrated in FIGS. 1 to 3, and 7, in the case of fixedly installing the support plate 40 on the upper part of the lower frame 3 or the upper part of the mounting plate 15, it is preferable that a pair of first pivot holders 34 projecting upward from the tilt plate 30 at a specified height and a pair of second pivot holders 39 are formed at an interval of about 90° as in a plan view, or the first tilt shaft A is arranged in a direction of a slanting line rotated to the left side that is at an angle of about 45° to the vertical center line C of the tilt plate 30 that crosses the center line T in the length direction of the lower frame 3.

In an embodiment of the present invention, it can be understood that the center line T in the length direction of the lower frame 3 includes a track center line formed roughly in the center of the length of the typical track chassis 4a and 4b, and it is possible to move the vertical center line C of the tilt frame 30 and the corresponding radial line R on the lower frame 3 in consideration of the movement of the upper swing structure 1 and its center of gravity.

In an embodiment of the present invention, the swing bearing mounting plate 20 can be attached to and detached from the swing bearing 9 through a bolting assembly in accordance with various specifications of the conventional swing bearing, and a penetration part for installing therein a turning joint, a hydraulic pipe, and an electric device, and the like, may be further formed roughly in the center of the swing bearing mounting plate 20.

The unexplained reference numeral "14" denotes the second shaft that is shaft-engaged with the second pivot holder 39 of the tilt plate 30 and an engagement hole 41 of the pivot support part 44 of the support plate 40, "18" denotes a piston fixing pin member for fixing the piston holders 25 and 45, "19" denotes a cylinder fixing pin member for fixing the actuators 11a, 11b, 12a, and 12b to the cylinder holders 36, 36, 37, and 38, respectively, "26" denotes a fixing hole for engaging with a bolt for fixing the swing bearing, and "46" denotes a cylinder holder cover for fixing an actuator housing.

Hereinafter, the operation and effect of the leveling apparatus for excavator and forestry machine equipment according to an embodiment of the present invention will be described.

The leveling apparatus for excavator and forestry machine equipment according to an embodiment of the present invention is typically operated by a hydraulic pump connected to an engine.

As illustrated in FIGS. 1 to 3, the support plate 40 is mounted on the upper part of the mounting plate 15 formed roughly in the center of the lower frame 3 connected to the left and right track chassis 4a and 4b. On the upper part of the support plate 40, the pivot support parts 44 of the support plate 40 and the second pivot holders 39 of the tilt plate 30 are formed to be tilted at a specified angle by the second shaft 14, and on the upper part of the tilt plate 30, the first pivot holders 34 and the pivot support parts 24 of the swing bearing mounting plate 20 are formed to be tilted at a specified angle by the first shaft 13, so that the upper swing structure 1 and the swing bearing 9 are supported on the upper part of the swing bearing mounting plate 20 through driving forces of the first actuators 11a and 11b and the second actuators 12a and 12b.

When the lower driving structure 10 moves on the ground E that is inclined against the horizontal surface H, the first shaft 13 and the second shaft 14 act as the first tilt shaft A and the second tilt shaft B, which have different heights and cross each other, and by the extension and contraction of the first actuators 11a and 11b and the second actuators 12a and 12b, the swing bearing mounting plate 20 performs a predetermined up/down seesaw movement along directions of the first tilt shaft A and the second tilt shaft B to change the tilt angle.

For example, when the first actuators 11a and 11b are extended and contracted at an angle of about 40~50 on the radial line R, a pair of first pivot holders 34 radially apart from each other on the both end parts 33a of the tilt plate 30 and the pivot support parts 24 of the swing bearing mounting plate 20 perform a seesaw movement around the center line (which means the second tilt shaft B) of the second shaft 14 to create up/down displacements, and thus the tilt angle of the swing bearing mounting plate 20 is changed.

Preferably, when the pair of first actuators 11a and 11b and the pair of second actuators 12a and 12b are successively or simultaneously extended and contracted upward and downward in a state that they keep an interval of 90° in a counterclockwise direction around the vertical center line C of the tilt plate 30, the swing bearing mounting plate 20 makes an angle change required for the horizontal leveling of the upper swing structure 1 in accordance with the inclination of the ground E through the up/down displacements of the first shaft 13 and the second shaft 14 formed on the tilt plate 30.

For example, in the case where the second tilt shaft B is in a horizontal state, but the first tilt shaft A is in an inclined state against the ground E due to the inclination of the ground in the middle of the equipment's going downhill, the first shaft side 13 of the tilt plate 30 that is coupled to the swing bearing mounting plate 20 performs seesaw movements around the second shaft 14 so as to offset the inclination of the first tilt shaft A.

In this case, referring to FIG. 7A, the piston 17 of the first actuator 11a (on the left side in the drawing) fixed to the first cylinder holder 35 of the tilt plate 30 is extended, and simultaneously, the piston 17 of the first actuator 11b (on the right side in the drawing) fixed to the first cylinder holder 36 of the tilt plate 30 is contracted.

Accordingly, the first pivot holder 34 of the tilt plate 30 and the pivot support part 24 of the swing bearing mounting plate 20, which are coupled to each other by the first shaft, perform left/right seesaw movements around the second shaft 14 (which means the second tilt shaft B), and the tilting angle of the swing bearing mounting plate 20 is controlled until the inclination of the ground E is offset, so that the horizontal level of the swing bearing 9 and the upper swing structure 1 is kept to coincide with the horizontal surface E.

Here, the load being applied to the tilt plate 30 and the support plate 40 during the extension and contraction of the first actuators 11a and 11b is dispersed by the rib frame structure formed on the respective ribs 32 and 42 through the first cylinder holders 35 and 26 and the first piston holders 45 of the support plate 40.

Also, since the first actuators 11a and 11b can be extended and contracted upward/downward at maximum on the left side or the right side that is at an angle of about 40°~50° to the center line T in the length direction of the lower frame 3, the rear part R of the upper swing structure 1 appears not to collide or interfere with the track chassis 4a and 4b of the lower frame 3.

In other words, even in the case of installing the first actuators 11a and 11b or the second actuators 12a and 12b adjacent to the center line T in the length direction of the left/right lower frame 3, a danger of interference or collision of the lower part of the upper swing structure 1 with the left and right track chassis 4a and 4b can be removed.

On the other hand, in the case where the first tilt shaft A is in a horizontal state, but the second tilt shaft B is inclined against the ground E, both end parts 23 of the swing bearing mounting plate 20 perform seesaw movements around the first shaft 13 so as to offset the inclination of the second tilt shaft B.

That is, as illustrated in FIG. 7B, the second actuator 12a on the left side as in the drawing is extended on the second piston holder 25 adjacent to one end part 23 of the swing bearing mounting plate 20, and simultaneously, the second actuator 12b on the right side as in the drawing is contracted.

Accordingly, even if the tilt plate 30 and the support frame 40 are inclined on the upper part of the lower frame 3, the left side and the right side of the swing bearing mounting plate 20 perform right/left seesaw movements around the first shaft 13 (which means the first tilt shaft A), and the tilting angle of the swing bearing mounting plate 20 is controlled until the inclination of the ground E is offset, so that the horizontal level of the swing bearing 9 and the upper swing structure 1 is kept to coincide with the horizontal surface E.

On the other hand, as illustrated in FIGS. 9A to 9D, in the case where the upper swing structure 1 is tilted to front and rear sides corresponding to the center line T in the length direction of the lower frame 3 or to left and right sides due to the inclination of the ground E, both the first tilt shaft A and the second tilt shaft B are inclined against the ground E, and in this case, it is required for the first shaft 13 and the second shaft 14 to simultaneously or successively perform seesaw movements.

That is, both the first actuators 11a and 11b and the second actuators 12a and 12b are extended and contracted to push or pull the pivot support sides 24 and the second piston holders 25 of the swing bearing mounting plate 20 so that the upper swing structure 1 is kept at the horizontal level as a danger of the collision or interference of the front (F), rear (R), left (L), or right (R) side of the lower part of the upper swing structure 1 is removed.

At this time, for the change of the tilt angle, the rocking movements of the swing bearing mounting plate 20 and the tilt plate 30 are performed as the actuators 11a, 11b, 12a, and 12b fixed to the cylinder holders 35, 36, 37, and 38 of the tilt plate 30, respectively, are alternately or successively extended and contracted, or almost simultaneously driven. Since the upward/downward seesaw movements are performed around the first shaft 13 and the second shaft 14 in the same manner during such a tilt operation, the detailed description thereof will be omitted.

According to an embodiment of the present invention, the tilt plate 30 and the support plate 40 are installed on the mounting plate 15 formed roughly in the center of the lower frame 3, the first actuators 11a and lib are installed opposite to each other on the radial line R drawn on the right side that is at an angle of 45° to the center line T in the length direction of the lower frame 3, and the leveling range of the equipment in every direction is adjusted over 20° against the horizontal surface H when the second actuators 12a and 12b are opposite to each other on the right side that is at an angle of 45°.

According to the present invention, the tilt range of the upper swing structure 1 that is mounted on the upper part of the swing bearing mounting plate 20 does not lean upon the inclined area in the left/right direction of the equipment or the inclined area in the front/rear direction, but is roughly symmetrically applied, so that the capacity and the size of the actuators are relatively reduced in comparison to the conventional structure with the height of the equipment kept lowered.

The extension and contraction of the first actuators 11a and lib and the second actuators 12a and 12b as described above may be diversely modified through an algorithm preset to control the flow rate or the size of the cylinders in accordance with the tilt angle of the upper swing structure required during the movement of the equipment on the inclined ground E.

As described above, according to the leveling apparatus for excavator and forestry machine equipment according to the present invention, since the actuators are driven along the radial line rotated to the left or right side that is at an angle of about 45° to the center line T in the length direction of the lower frame, the capacity and the size of the actuators can be relatively reduced with the height of the equipment kept lowered, and the tilt angle of the swing bearing mounting plate can be changed without occurring any collision or interference in every direction of the lower driving structure and the track chassis. Also, by uniformly dispersing the load being applied to the respective actuators, the horizontal level of the upper swing structure can be stably maintained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A leveling apparatus for excavator and forestry machine equipment, which is mounted between an upper swing structure and a lower frame formed on a lower driving structure including a swing bearing formed on a lower part of the upper swing structure, left and right track chassis, and a front arm and a rear arm connected to upper parts of the track chassis, to keep a horizontal level of the upper swing structure against an inclined ground, the leveling apparatus comprising:

a swing bearing mounting plate mounted on a lower part of the swing bearing and including a pair of pivot support parts projecting in a downward direction of the swing bearing to support a first tilt shaft and a pair of second piston holders;

a support plate fixedly installed on an upper part of the lower frame and having a pair of pivot support parts projecting to support a second tilt shaft and a pair of first piston holders;

a tilt plate mounted between the swing bearing mounting plate and the support plate to be tilted, and including a pair of first pivot holders formed to project upward from one end part of a main body, a pair of second pivot holders formed to project downward from the other end of the main body radially apart from the first pivot holders, a first shaft rotatably fixing the first pivot holders and the pivot support parts of the swing bearing mounting plate to form the first tilt shaft, and a second shaft rotatably fixing the second pivot holders and the pivot support parts of the support plate to form the second tilt shaft, wherein the axis of the first tilt shaft is oriented in a different direction than the axis of the second tilt shaft; and a pair of first actuators one side of which is fixed to the tilt plate to rock the first tilt shaft during their extension and contraction, and a pair of second actuators fixed to rock one side of the swing bearing mounting plate during their extension and contraction; wherein the tilt plate includes a vertical center line crossing a center line in a length direction of the lower frame, and the respective actuators are installed to be radially apart from the vertical center line.

2. The leveling apparatus of claim 1, wherein the actuators are radially installed at intervals of 90° around the vertical center line that is parallel to the actuators.

3. The leveling apparatus of claim 2, wherein at least a pair of the actuators are installed opposite to each other on a radial line drawn on a left or right side that is at an angle of about 40°~50° to the center line in the length direction of the lower frame.

4. The leveling apparatus of claim 1, further comprising a pair of first cylinder holders provided on the tilt plate to support the first actuators so that the first actuators can be extended and contracted downward, and a pair of second cylinder holders provided on the tilt plate to support the second actuators so that the second actuators can be extended and contracted upward.

5. The leveling apparatus of claim 4, wherein the tilt plate is provided with a rib frame structure including a plurality of ribs in a horizontal direction corresponding to a direction of the first tilt shaft and a plurality of ribs in a vertical direction corresponding to a direction of the second tilt shaft, and the first cylinder holders and the second cylinder holders are formed to project from the ribs.

6. The leveling apparatus of claim 5, wherein the second tilt shaft is below the first tilt shaft, and the axis of the second tilt shaft is oriented at an angle of 90° with respect to the axis of the first tilt shaft.

7. The leveling apparatus of claim 4, wherein pistons extending and contracting in the first actuators are fixed to first piston holders of the support plate, and pistons extending and contracting in the second actuators are fixed to second piston holders of the swing bearing mounting plate.

8. The leveling apparatus of claim 4, wherein the first cylinder holders and the second cylinder holders are provided inside a diameter that is formed when inner surfaces of the first pivot holders are extended.

9. The leveling apparatus of claim 1, wherein the support plate is fixedly installed on a mounting plate formed in the center of the lower frame.

10. The leveling apparatus of claim 1, wherein the first shaft is installed on a radial line rotated to a left or right side that is at an angle of 40°~50° to the center line in the length direction of the lower frame as in a plan view, and when the first actuators are extended and contracted upward and downward, the first pivot holders are moved upward and downward on the basis of the second shaft that forms the second tilt shaft to change a tilt angle of the swing bearing mounting plate.

11. The leveling apparatus of claim 1, wherein the second shaft is installed in a direction of a slanting line tilted to a left or right side that is at an angle of 40°~50° to the center line in the length direction of the lower frame as in a plan view, and when the second actuators are extended and contracted upward and downward, the second piston holders are moved upward and downward on the basis of the first shaft that forms the first tilt shaft to change a tilt angle of the swing bearing mounting plate.

12. The leveling apparatus of claim 1, wherein the support plate is provided with a rib frame structure including a plurality of ribs in a horizontal direction corresponding to a direction of the first tilt shaft and a plurality of ribs in a vertical direction corresponding to a direction of the second tilt shaft.

13. The leveling apparatus of claim 12, wherein the first piston holders are formed to project downward from the ribs in the vertical direction to rotatably fix the pistons of the first actuators.

14. The leveling apparatus of claim 1, wherein the swing bearing mounting plate is provided with a rib frame structure including a plurality of ribs in a horizontal direction corresponding to a direction of the first tilt shaft and a plurality of ribs in a vertical direction corresponding to a direction of the second tilt shaft.

15. The leveling apparatus of claim 14, wherein the second piston holders are formed to project downward from the ribs in the vertical direction to rotatably fix the pistons of the second actuators.

* * * * *